United States Patent
Armacanqui et al.

(10) Patent No.: US 7,169,504 B2
(45) Date of Patent: *Jan. 30, 2007

(54) ALKALINE CELL WITH PERFORMANCE ENHANCING ADDITIVES

(75) Inventors: Miguel E. Armacanqui, Madison, WI (US); Ernest Ndzebet, Madison, WI (US); William C. Bushong, Madison, WI (US); Gregory S. Moy, Madison, WI (US); Viet H. Vu, Verona, WI (US); David R. Mihara, Madison, WI (US); Jeffrey A. Poirier, Madison, WI (US)

(73) Assignee: Rovcal, Inc., Fresno, CA (US)

( * ) Notice: Subject to any disclaimer, the term of this patent is extended or adjusted under 35 U.S.C. 154(b) by 352 days.

This patent is subject to a terminal disclaimer.

(21) Appl. No.: 10/375,381

(22) Filed: Feb. 27, 2003
(Under 37 CFR 1.47)

(65) Prior Publication Data

US 2004/0033418 A1 Feb. 19, 2004

Related U.S. Application Data

(63) Continuation-in-part of application No. 10/090,137, filed on Feb. 27, 2002, now Pat. No. 6,872,489.

(51) Int. Cl.
*H01M 4/62* (2006.01)
*H01M 4/42* (2006.01)
(52) U.S. Cl. .................. 429/59; 429/212; 429/217; 429/229
(58) Field of Classification Search .................. 429/59, 429/212, 217, 229, 230, 231
See application file for complete search history.

(56) References Cited

U.S. PATENT DOCUMENTS

| 3,918,989 A | 11/1975 | Gillman |
| 4,195,120 A | 3/1980 | Rossler et al. |
| 4,777,100 A | 10/1988 | Chalilpoyil |

(Continued)

FOREIGN PATENT DOCUMENTS

EP 0 457 354 A1 11/1991

(Continued)

OTHER PUBLICATIONS

Glaeser, W. - Gas Evolution Data on Very-Low-Mercury-Content Zinc Powders for Alkaline Batteries, Power Sources 12: Research and Development in Non-Mechanical Electrical Power Sources, Proceedings of the 16th International Power Sources Symposium held at Bournemouth, Sep. 1988, Chapter 18, T. Keily and B.W. Baxter, eds., 1989.

(Continued)

*Primary Examiner*—Stephen J. Kalafut
(74) *Attorney, Agent, or Firm*—Senniger Powers

(57) ABSTRACT

A sulfonic acid type organic surfactant is incorporated into the gelled anode mixture of an alkaline electrochemical cell, optionally with an organic phosphate ester surfactant. Zinc fines may also be incorporated into the anode. The electrolyte included in the anode mixture may have a reduced hydroxide concentration. When a cell is provided whose anode mixture includes the two surfactants and zinc fines alone or in combination with a lowered hydroxide concentration in the electrolyte, discharge leakage is reduced and gel gassing is suppressed relative to that of gels lacking both surfactants. Additionally, cell discharge performance is improved relative to that of cells lacking both the zinc fines and lowered hydroxide concentration.

144 Claims, 7 Drawing Sheets

U.S. PATENT DOCUMENTS

| | | |
|---|---|---|
| 5,128,222 A | 7/1992 | Yoshizawa |
| 5,224,927 A | 7/1993 | Tapper |
| 5,342,712 A | 8/1994 | Mieczkowska et al. |
| 5,378,559 A | 1/1995 | Randell |
| 5,401,590 A | 3/1995 | Chalilpoyil |
| 5,419,987 A | 5/1995 | Goldstein et al. |
| 5,584,943 A * | 12/1996 | Banaszak et al. ........... 148/246 |
| 6,040,088 A | 3/2000 | Bennett |
| 6,251,539 B1 | 6/2001 | Brys et al. |
| 6,284,410 B1 | 9/2001 | Durkot |
| 6,302,209 B1 * | 10/2001 | Thompson et al. ...... 166/305.1 |
| 6,495,289 B1 | 12/2002 | Kawakami et al. |
| 6,555,266 B1 | 4/2003 | Woodnorth |
| 6,872,489 B2 * | 3/2005 | Armacanqui et al. ....... 429/212 |
| 6,927,000 B2 | 8/2005 | Ndzebet |
| 6,991,875 B2 | 1/2006 | Christian et al. |

FOREIGN PATENT DOCUMENTS

| | | |
|---|---|---|
| EP | 0 510 239 A1 | 10/1992 |
| JP | 62222568 | 9/1987 |
| JP | 1231272 A2 | 9/1989 |
| JP | 3071559 A2 | 3/1991 |
| JP | 5174826 A2 | 7/1993 |
| WO | WO 03/073530 A2 | 9/2003 |

OTHER PUBLICATIONS

Strauven, Y. and Meeus, M. - Quality Requirements for Zinc Powders in Green Alkaline Batteries, Program of Technical Conference in China International Battery Fair (CIBF) '95, Abstract, pp. 80-83, Beijing, 1995.

Strauven, Y. Meeus, M. - Quality Requirements for Zinc Powders in Green Alkaline Batteries, Papers of Technical Conference in China International Battery Fair (CIBF) '95, pp. 33-34, Beijing, 1995.

* cited by examiner

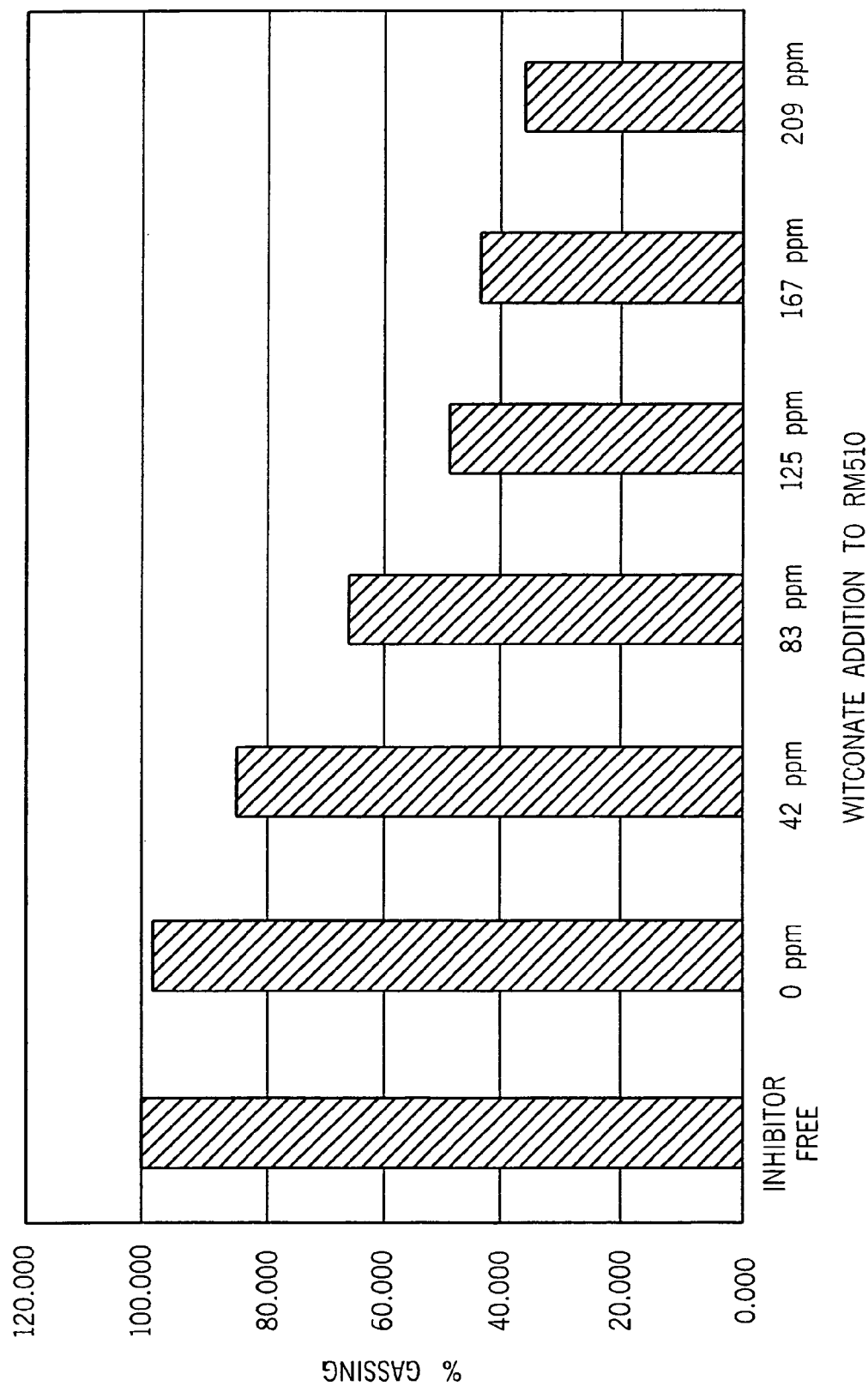

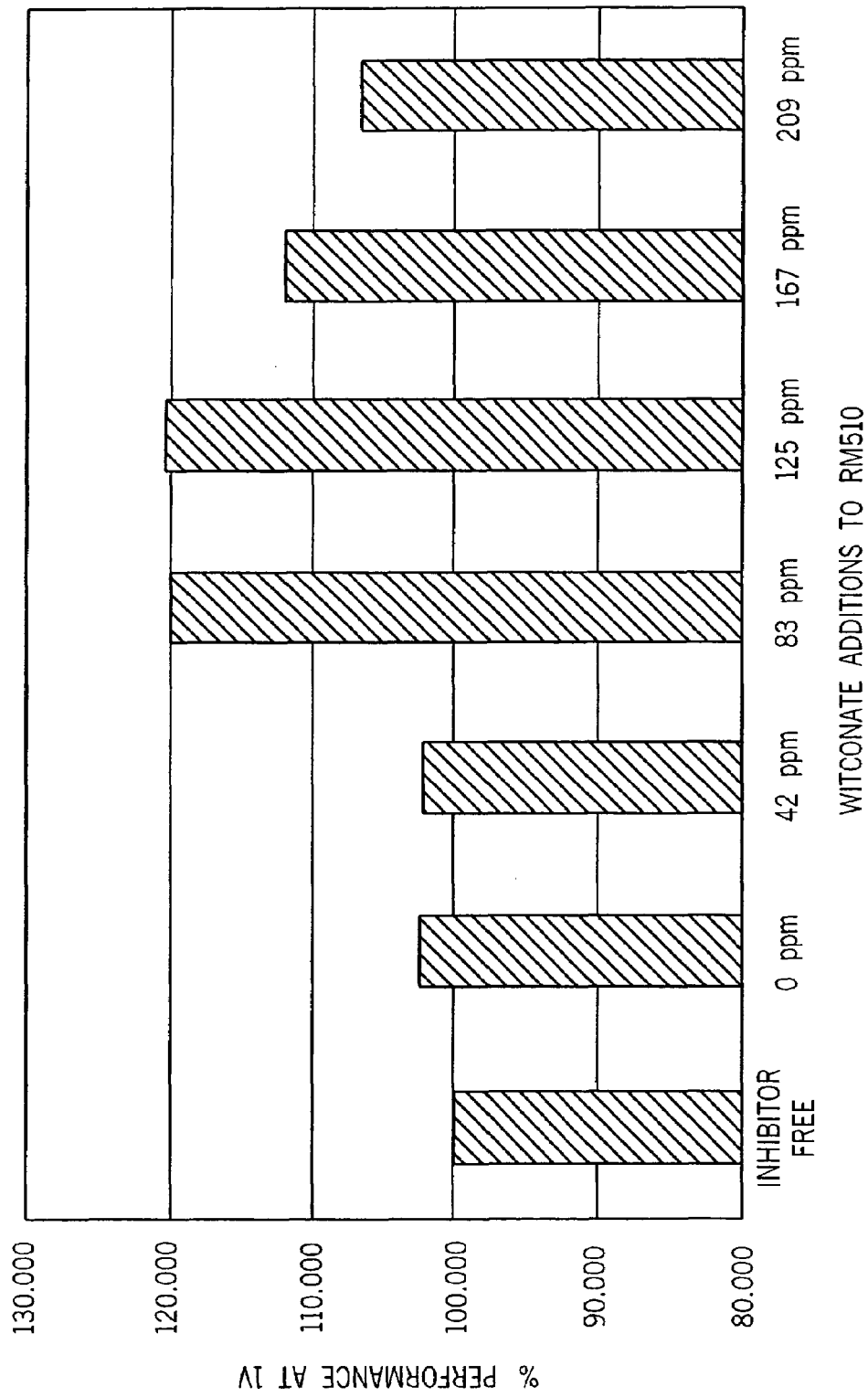

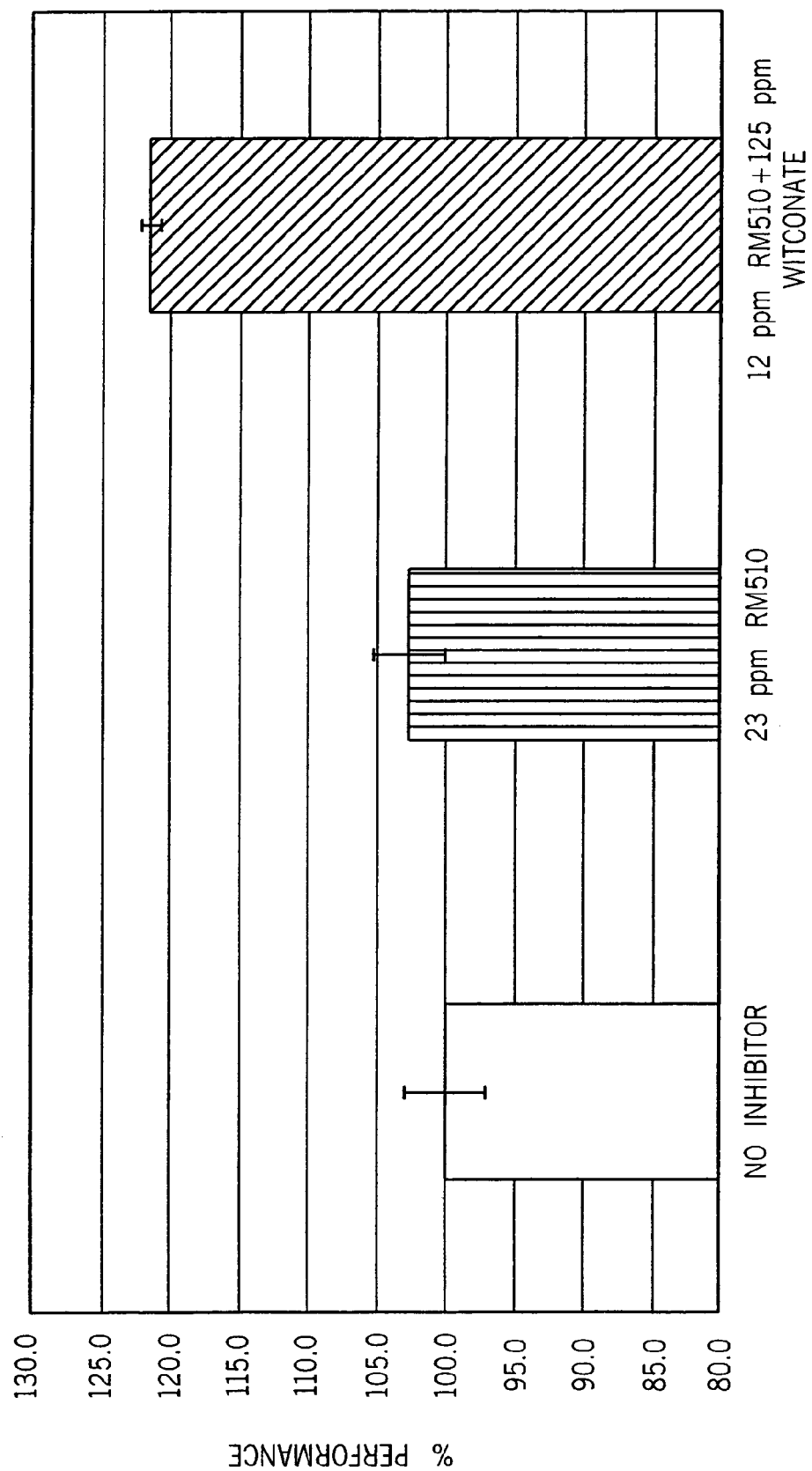

ALKALINE CELL WITH PERFORMANCE ENHANCING ADDITIVES

CROSS-REFERENCE TO RELATED APPLICATIONS

This is a continuation-in-part of U.S. Ser. No. 10/090,137, filed Feb. 27, 2002 (now U.S. Pat. No. 6,872,489) and entitled "Alkaline Cell with Gassing Inhibitors", the disclosure of which is hereby incorporated by reference as if set forth in its entirety herein.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the term of Contract No. 99128200.

BACKGROUND OF THE INVENTION

Zinc anode gels of alkaline electrochemical cells are prone to electrochemical corrosion reactions when stored at or above room temperature. The alkaline electrolyte in the anode gel corrodes the zinc anode upon contact, forming oxidized zinc products that decrease the availability of active zinc while simultaneously generating hydrogen gas. The rate of corrosion tends to increase as the electrolyte is made more diluted and as the storage temperature rises and can lead to a significant decrease in cell capacity. Cell discharge performance, on the other hand, can be improved making the electrolyte increasingly diluted. It is thus desirable to suppress gas generation when using diluted alkaline electrolytes for increased performance. The additional water aids in the following cathodic reaction:

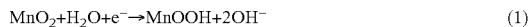

$$MnO_2 + H_2O + e^- \rightarrow MnOOH + 2OH^- \qquad (1)$$

However, lowering the hydroxide concentration in the electrolyte can cause the anode to become over-diluted and depleted in hydroxide ions which are needed to sustain the anodic cell reaction:

$$Zn + 4OH^- \rightarrow Zn(OH)_4^{2-} + 2e^- \qquad (2)$$

The depletion of hydroxide ions can become prominent during medium and high continuous discharge rates and induce depressed cell performance due to anode failure in these cases. Furthermore, when the electrolyte is saturated with zincate $Zn(OH)_4^{2-}$ produced in the above reaction, the zincate precipitates to form zinc oxide which, in turn, passivates the zinc anode, thereby lowering cell performance.

Additionally, hydrogen gas generated during corrosion reactions can increase the internal cell pressure, cause electrolyte leakage and disrupt cell integrity. The rate at which the hydrogen gas is generated at the anode zinc surface accelerates when the battery is partially discharged, thereby decreasing the battery's resistance to electrolyte leakage. The electrochemical corrosion reactions that lead to hydrogen evolution involve cathodic and anodic sites on the zinc anode surface. Such sites can include surface and bulk metal impurities, surface lattice features, grain boundary features, lattice defects, point defects, and inclusions.

To minimize undesirable corrosion and gassing during storage, it is typical to employ corrosion-resistant zinc alloys and to reduce the extent of impurities in the anode. Additionally, organic surfactants and inorganic corrosion-inhibiting agents are commonly added to zinc anodes. Surfactants act at the anode-electrolyte interface by forming a hydrophobic film that protects the zinc anode surface during storage. The inhibitive efficiency of surfactants to increase the corrosion resistance of zinc depends on their chemical structure, concentration, and their stability in the electrolyte.

Among the surfactants known to be effective at controlling gassing are organic phosphate esters such as the ethylene oxide-adduct type disclosed by Rossler et al. in U.S. Pat. No. 4,195,120, incorporated herein by reference. In U.S. Pat. No. 4,777,100, Chalilpoyil et al. disclosed an anode containing single crystal zinc particles with a surface-active heteropolar ethylene oxide additive including organic phosphate esters. In U.S. Pat. No. 5,378,559, Randell et al. disclose a galvanic cell that contains a phosphate ester compound to reduce gassing attributed to the brass anode current collector.

Despite their ability to control gel gassing and cell gassing, organic phosphate ester corrosion-inhibiting surfactants also typically decrease high rate discharge performance in electrochemical cells and can adversely affect intermittent cell discharge performance. Therefore, new approaches are sought for inhibiting corrosion and preventing leakage without simultaneously reducing high rate cell discharge performance. At the same time, it is also of interest to develop new classes of corrosion-inhibiting surfactants for use in gelled anodes of alkaline electrochemical cells.

BRIEF SUMMARY OF THE INVENTION

The present invention is summarized in that acceptable gel gassing levels are maintained when the gel of an alkaline electrochemical cell contains a surfactant having the general formula $Y \: SOx^-$ where preferably $x=3$ or $x=4$ and Y preferably is selected from an alkyl group, an aryl group, an alkylaryl group, and a carboxy acid group $[(CH2)_n-COO]$, or a salt of any of the foregoing, where the number of carbon atoms, n, in an alkyl chain preferably ranges from 1 to about 26. To the knowledge of the inventors, sulfonated or sulfated acid type surfactants have not previously been employed in gelled anodes, but are shown herein to effectively help inhibit discharge leakage and to maintain cell integrity.

The invention is further summarized in that unexpected and advantageous benefits are recognized when the aforementioned acid type surfactant or salt thereof is used in combination with a phosphate ester surfactant that can be added to the gelled anode in an amount ranging from 0.0003% to 0.02%. For example, cell reliability can be maintained and cell gassing can be suppressed.

The invention is further summarized in that unexpected and advantageous benefits are recognized when the aforementioned acid type surfactant or salt thereof is used in combination with a phosphate ester surfactant when zinc particles are added to the gelled anode. For example, cell performance can be increased and cell gassing can be suppressed.

The invention is further summarized in that unexpected and advantageous benefits are recognized when the aforementioned acid type surfactant or salt thereof is used in combination with a phosphate ester surfactant when the gel contains an electrolyte having a hydroxide concentration less than 40%. For example, cell performance can be increased and cell gassing can be suppressed.

It is an object of the present invention to provide an alkaline electrochemical cell in combination with either or both of zinc particles added to the anode, and an electrolyte having a hydroxide concentration less than 40%.

It is a further object of the present invention to provide a class of surfactants for reducing gelled anode gassing in an alkaline electrochemical cell in combination with either or both of zinc particles added to the anode, and an electrolyte having a hydroxide concentration less than 40%.

It is an advantage of the present invention that, when zinc particles are added to the gelled anode mix, gel gassing is controlled in an alkaline electrochemical cell that includes a sulfonic acid type surfactant in the gelled anode mix.

It is another advantage of the present invention that gel gassing is controlled and cell discharge performance is increased in an alkaline electrochemical cell that includes both a sulfonated or sulfated organic acid type organic surfactant, an organic phosphate ester surfactant, and an electrolyte having a hydroxide concentration less than 40% in the gelled anode mix.

These and other aspects of the invention are not intended to define the scope of the invention for which purpose claims are provided. In the following description, reference is made to the accompanying drawings, which form a part hereof, and in which there is shown by way of illustration, and not limitation, a preferred embodiment of the invention. Such embodiment does not define the scope of the invention and reference must be made therefore to the claims for this purpose.

BRIEF DESCRIPTION OF THE SEVERAL VIEWS OF THE DRAWINGS

The following figures are presented, in which:

FIG. 1A is a graph illustrating levels of gassing in an electrochemical cell having varying amounts of Witconate and RM-510 added to its gelled anode mixture;

FIG. 1B is a graph illustrating the performance of an electrochemical cell having varying amounts of Witconate and RM-510 added to its gelled anode mixture;

FIG. 1C is a graph illustrating the performance of an electrochemical cell having various inhibitors added to its gelled anode mixture;

DETAILED DESCRIPTION OF THE INVENTION

Figure 2:
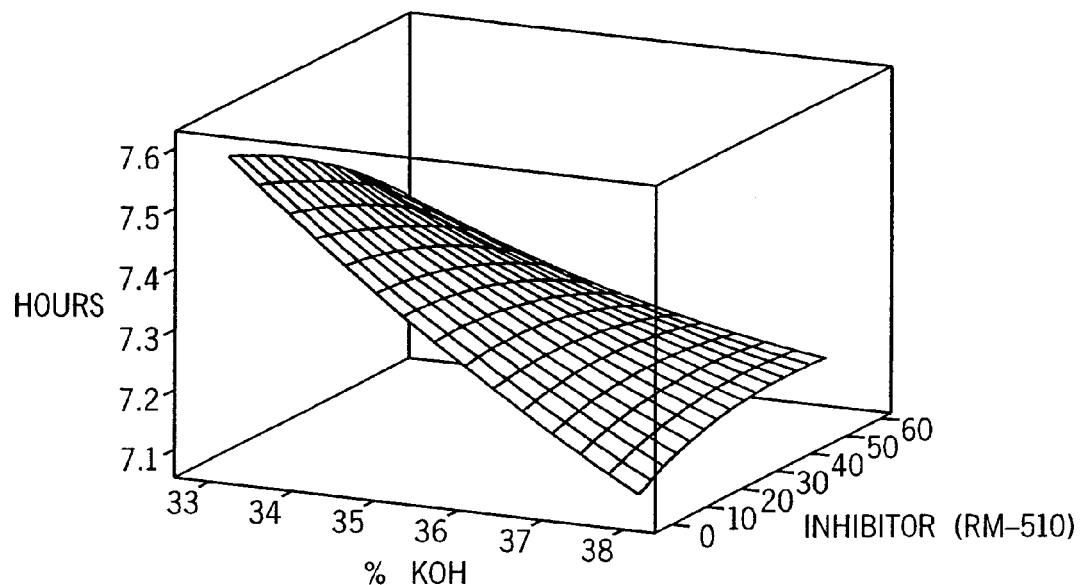
FIG. 2 is a 3-dimensional representation of cell longevity as a function of KOH concentration in the electrolyte and the amount of inhibitor added to the anode.

The present invention relates to the use of a sulfonated or sulfated organic acid surfactant alone or in combination with an organic phosphate ester surfactant. In the present invention, the inhibitor(s) are added into the gelled anode of an alkaline electrochemical cell. The invention further contemplates that the amount of electrolyte present may be reduced, and zinc fine particles (also referred to herein as zinc fines) may be added to the electrolyte, either alone or in combination with each other, and alone or in combination with the inhibitor(s) described herein (e.g., phosphate surfactant and/or sulfontated organic surfactant) to produce improved cell performance.

A gelled anode mixture, a gelled anode, and an electrochemical cell containing the gelled anode can have the structures of and can be prepared as described in U.S. Pat. No. 6,040,088, incorporated by reference herein as if set for in its entirety, except as detailed below.

A suitable gelled anode according to the invention comprises a metal alloy powder (preferably an alloyed zinc powder), a gelling agent and an alkaline electrolyte. The skilled artisan can readily select a suitable zinc alloy powder and an alkaline electrolyte from those known to the art. It is noted that known gelling agents other than the sodium polyacrylate gelling agent described in the incorporated patent are suitable for use in the present invention. Such gelling agents include carboxymethyl cellulose, crosslinking-typed branched polyacrylate acid, natural gum, and the like.

A preferred sulfonated or sulfated organic acid type organic surfactant has the general formula Y $SOx^-$ where preferably x=3 or x=4 and Y is preferably selected from an alkyl group, an aryl group, and alkylaryl group, and an carboxy acid group $[(CH_2)_n—COO^-]$, or a salt of any of the foregoing, where the number of carbon atoms, n, in an alkyl chain ranges from 1 to about 26. Among these surfactants, octadecanoic acids, such as oleic acid, and salts thereof are preferred. A particularly preferred agent is a sodium salt of sulfated oleic acid commercially available under the trade name Witconate™ 1840X, Dyasulf 2031, Dymosol 2031, Freedom SOA-70, and Freedom SOA-70WV. Other suitable sulfonated aryl, alkyl aryl, or alkyl compounds include other Witconate surfactants such as Witconate 90FH, Witconate 93S, Witconate 605A, and Witconate 1260.

The sulfated organic acid type surfactant is advantageously provided in the gelled anode mix at a concentration ranging from between about 0.001% to about 0.06% relative to the weight of the gelled anode (10 ppm and 600 ppm), and more preferably between about 0.002% and about 0.03% (20 ppm and 300 ppm). In the stated ranges, the sulfonated organic surfactant, alone or in combination with an organic phosphate ester surfactant, reduced KOH concentrations and zinc fines added to the anode, provides desirable gel characteristics as described herein. In the stated ranges, and in the presence of a phosphate organic ester, the sulfonated organic surfactant tends to suppress overdischarge leakage while reducing gel gassing and improving on intermittent discharge performance. Overdischarge leakage is reduced by at least 20%, more preferably by at least 50%, and most preferably to 0, relative to cells lacking these surfactants. When an organic phosphate ester surfactant is provided in the gelled anode mix, it is present at a concentration ranging from between about 0.0003% and about 0.02% relative to the weight of the gelled anode (3 ppm and 200 ppm), and more preferably between about 0.0003% and about 0.005% (3 ppm and 50 ppm).

The invention further contemplates that the amount of inhibitor added to the cell may be expressed as a function of the weight of metal (e.g., zinc) in the anode. In particular, RM-510 is preferably added in the range of 0.0004% to 0.015% relative to the weight of metal in the gelled anode, and more preferably between 0.0004% and 0.0075%. Witconate is preferably added in the range of 0.0015% and 0.09% relative to the weight of metal in the gelled anode, and more preferably within the range of 0.003% and 0.045%. Either or both inhibitor may be added to the gelled anode mix either alone or in combination in accordance with any of the embodiments described in this disclosure, unless otherwise specified.

EXAMPLES

Table 1 shows that the three-day gassing rate of gels containing the sulfonated surfactant and the phosphate ester in combination was appreciably suppressed relative to that of surfactant-free gels or to that of gels containing either surfactant alone. The gels of Table 1 were supplemented as shown either with RM-510 to 0.0035%, with Witconate 1840X to 0.0125%, or with both surfactants at the same concentrations, relative to the weight of zinc in the anode gel.

TABLE 1

| Description of Gel sample | Three-day Gel Gassing µl/g/day |
|---|---|
| No inhibitor | 6.2 ± 1.0 |
| RM-510 | 5.4 ± 0.9 |
| Witconate 1840X | 6.8 ± 0.6 |
| Witconate 1840X + RM-510 | 3.9 ± 0.5 |

Table 2 summarizes partial discharge cell gassing measured in LR03 cells after discharge at 7.5 ohm to a 1.0 volt end voltage and storage for two weeks at 160° F. Overdischarge leakage was measured after continuous discharge at 10 ohms for 48 hours followed by room temperature storage for five weeks. Discharge performance of LR03 cells at 600 mA during 10 seconds per minute for 1 hour a day, was improved over the discharge performance of cells containing the phosphate ester alone. The gelled anode of otherwise conventional alkaline LR03 cells contained RM-510 to about 0.0035% either alone or in combination with Witconate 1840X to about 0.0125%, the amount of both surfactants being measured relative to the weight of zinc alloy in the anode.

TABLE 2

| | Overdischarge Leakage % | Partial Discharge Cell Gas Ml | 600 mA Pulse No-delay Cycles to 0.9 V |
|---|---|---|---|
| Witconate + RM-510 | 20 | 0.36 ± 0.11 | 390.4 ± 3.5 |
| RM-510 | 60 | 0.50 ± 0.23 | 362.2 ± 13.8 |

Further, Table 3 shows that the discharge performance at 500 mA of continuous discharge of the LR03 cells containing both surfactants in the gelled anode was superior to that of the cells that contained only the phosphate ester additive. Table 3 also shows that the high-rate constant current discharge performance after high temperature storage was significantly better in the LR03 cells containing both surfactants than in cells containing the phosphate ester alone.

TABLE 3

| | 500 mA No-Delay Minutes to 0.9 V | 500 mA 14 days at 130° F. Minutes to 0.9 V |
|---|---|---|
| Witconate + RM-510 | 52.6 ± 2.8 | 55.6 ± 1.7 |
| RM-510 | 48.0 ± 0.9 | 53.0 ± 1.7 |

Electrochemical cells described herein are generally of the type having a positive current collector, and a cathode in contact with the positive current collector. The cell includes a gelled anode including at least a metal alloy powder (which could be a zinc alloy powder), a gelling agent, and an alkaline electrolyte. A separator is disposed between the cathode and the anode, and a negative current collector is in electrical contact with the anode.

FIG. 1A illustrates the gassing characteristics of a LR6 electrochemical cell (size AA) having various amounts of Witconate in combination with RM-510. The results indicate that anode gel gassing is reduced as Witconate is increasingly added to the anode. FIG. 1B illustrates the performance of the cell tested corresponding to data shown in FIG. 1A, and indicates that cell performance increases until reaching an optimal value before decreasing. Under the parameters of this test, a Witconate concentration of 125 ppm relative to the gelled anode mixture achieved optimal results, though any amount of Witconate present in the anode between 0 and 209 ppm increased cell performance compared to the control cell that was inhibitor free. FIG. 1C illustrates that the addition of Witconate and RM-510 in the anode of an electrochemical cell enables increased cell performance at 1 A of continuous discharge over a cell containing RM-510 alone, or a cell that is inhibitor free. The performance was measured using the amount of time needed for the cell to output 1 volt during discharge at 1 A.

It should be appreciated that electrochemical cells may be tested in accordance with several methods under the American National Standards Institute (ANSI). These tests include determining cell performance/longevity under situations of constant cell discharge, cell pulse discharge (i.e., repeated application of 1 A for a period of 10 seconds carried out every minute over the period of an hour per day), and intermittent cell discharge (i.e., a continuous discharge for repeated limited periods of time, for example one hour per day). The present invention recognizes that the various embodiments of the present invention increase cell performance under one or more of these tests, as will now be described.

For instance, FIG. 2 illustrates the ANSI results of a LR6 cell including zinc fines and RM-510 inhibitor that was tested at 3.9 Ohm 1 Hr/day of discharge. In particular, the life of the cell is measured under various conditions of KOH concentration (measured as a percentage by weight of total electrolyte, i.e., the KOH concentration) and under various amounts of RM-510 added to the anode. It is observed that the service life of the cell is increased as the concentration of KOH in the electrolyte is decreased from 38% to 33%, which reduces anode passivation. The present invention recognizes that advantages may be achieved in a cell whose electrolyte has a concentration of 30% to 40%. Furthermore, as is discussed in more detail below, cell performance may enhanced using an anode gel having a KOH concentration between 20% and 30%. It is further observed that, while the addition of RM-510 alone is known to suppress gassing in the cell, overall cell performance is reduced as additional RM-510 is added. Nevertheless, the suppression of gassing is desirable to reduce the risk of increased internal cell pressure, which could cause electrolyte leakage and disrupt cell integrity.

Figure 3:
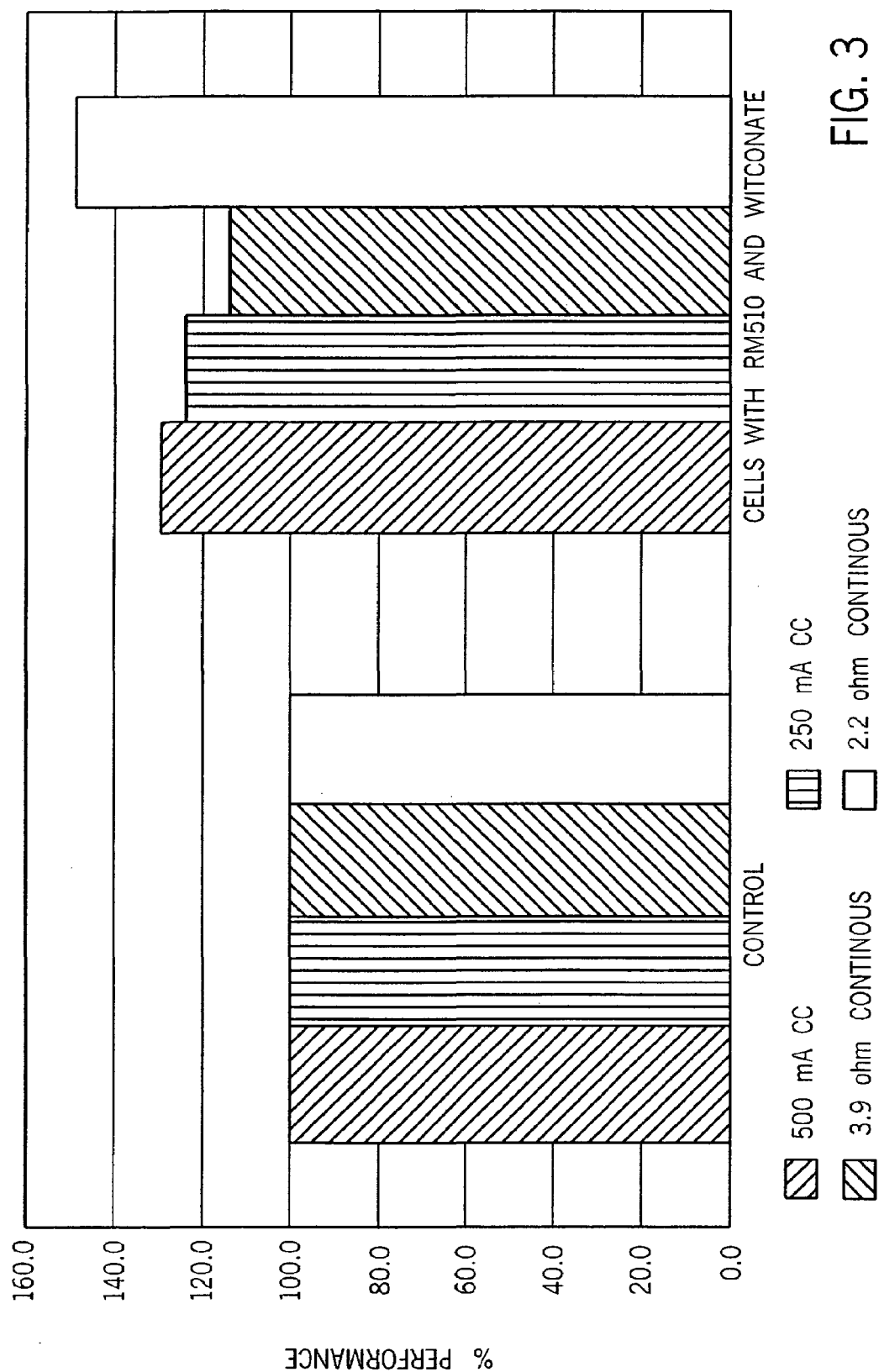
FIG. 3 is a graph illustrating the effect of the addition of RM-510 and Witconate to the anode of a cell on cell performance.

Referring to FIG. 3 the performance of a LR6 cell having a KOH concentration of 34% and RM-510 and Witconate added to the cell anode was compared to a control cell having a KOH concentration of 34% and RM510 added to the anode. The cells were discharged at several constant current rates. The results indicate that reduction of KOH concentration in the electrolyte, and the addition of RM-510 and Witconate to the anode increases cell performance compared to conventional cells. Performance was determined based on the amount of time needed for the cell to reach a discharge voltage of 0.8V at 2.2 and 3.9 ohm, and 0.9 V at 250 mA and 500 mA.

The present invention recognizes that another factor that controls cell performance relates to the surface area of the anode. Specifically, increasing the active anode electrode surface area provides sufficient active reaction sites needed to keep up with the cathodic reaction at high discharge rates. Accordingly, cells are provided having a predetermined amount of zinc particles (which may either be in the form of zinc or a zinc alloy) added to the anode gel. The present invention contemplates zinc particles less than about 76 microns (−200 mesh size), that is, particles that pass a 200 mesh screen size are present in the anode in an amount less than approximately 10%, by weight relative to the total zinc in the anode (including coarse Zinc particles), and preferably within the range of 1% and 10%, and more preferably between the range of 1% and 8%, and more preferably still within the range of 4% and 8%, it being appreciated that smaller particles further increase the effective surface area of the anode. Mesh sizes are stated herein to specify a range of particle sizes. For example, −200 mesh indicates particles smaller than 75 microns, whiles +200 mesh indicates particles larger than 75 microns. Alternatively still, desirable results may be attained using an amount of zinc fines greater than 10%, while the zinc particles having a diameter between 75 and 105 microns (+200 and −140 mesh size) may be present at anywhere between 1% and 50%, and more preferably between 10% and 40%, by weight of total zinc present in the anode.

The present invention recognizes that multiple ranges of zinc particles having a diameter less than 105 microns (−140 mesh size) including particles between 75 and 105 microns (+200 and −140 mesh size) and zinc fines less than 75 microns (−200 mesh size), may be used to increase cell performance. For instance, it has been discovered the anode may include zinc particles between 75 and 105 micrometers, and that the advantages in cell performance are enhanced when the anode gel has an electrolyte (KOH) concentration less than 30%, and preferably between 20% and 30%. When zinc fines have a size between the range of 20 and 75 micrometers (+625 and −200 mesh size), and preferably between 38 and 75 micrometers (+400 and −200 mesh size), cell performance is particularly enhanced when the KOH concentration is between 30% and 40%, and preferably between 33% and 38%. Yet another preferred range within the range of 20% and 40% KOH concentration is the range between 20% and 34%, and more preferably 25% and 33%, and more preferably still between 25% and 30%. A "low KOH concentration" as used in this disclosure refers to a KOH concentration within any of the above-stated ranges.

Even though improved cell performance has been correlated to the preferred ranges of zinc fine sizes in combination with the low KOH concentrations, one skilled in the art would also recognize the benefits of the addition of zinc fines and reduction of KOH individually. Accordingly, the present invention includes within its scope the addition of zinc fines to an anode gel having a size within any of the above-stated ranges either individually or in combination with any of the above-stated KOH concentrations. Likewise, the present invention includes within its scope an anode gel having a KOH concentration within any of the above-stated ranges either individually or in combination with zinc fines having a size within any of the above-stated ranges. Moreover, the above-stated zinc fines and/or KOH concentration may be implemented in a cell either alone or in combination with the inhibitors described herein (e.g., a phosphate surfactant and/or sulfontated surfactant).

Figure 4:
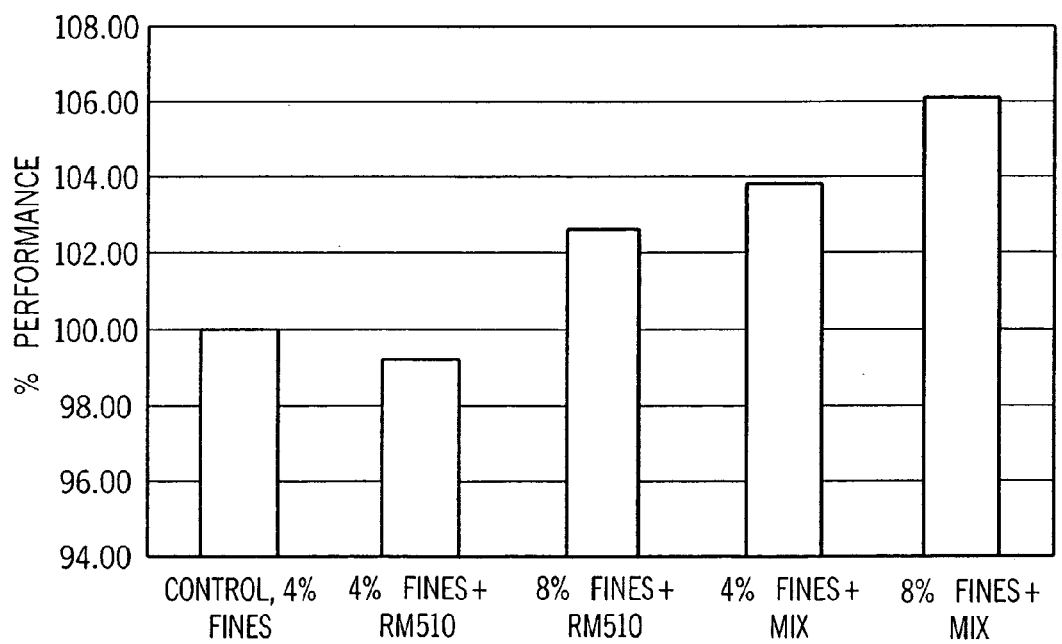
FIG. 4 is a graph illustrating the effect of the addition of RM-510, Witconate, and zinc fines to the anode of a cell on cell performance.

For instance, referring now to FIG. 4, the service life of LR03 cells were tested and compared against a control cell having 4% fines added to the anode without an inhibitor. The control cell also included a concentration of 37% KOH. A first test cell included 4% zinc fines in combination with RM-510 inhibitor, while a second test cell included 8% zinc fines in combination with RM-510 inhibitor. A third test cell included the additives of the first test cell, but further included an oleic acid inhibitor. A fourth test cell included the additives of the second test cell, but further included an oleic inhibitor. All test cells included a concentration of 34% KOH. The cell performance was measured as the amount of time that elapsed before a cell output voltage of 0.9V was measured.

The decreasing cell performance component associated with the addition of RM-510 overcame the increasing cell performance component associated with the decrease of KOH concentration, as the service life of the first test cell was slightly reduced compared to the control cell. However, the addition of 4% fines to the second test cell (for a total of 8%) in combination with a reduced KOH concentration overcame the disadvantages of RM-510 and produced a cell having a greater service life than the control cell. The third test cell, which was identical to the first test cell but for the addition of an oleic acid inhibitor, produced a service life greater than both the first and second test cells. The fourth test cell, which was identical to the second test cell but for the addition of an oleic acid inhibitor, produced a service life greater than all other test cells. Accordingly, a cell having added zinc fines may achieve improved performance over a comparable cell without zinc fines, and the performance may be further enhanced when an oleic acid inhibitor is added to the anode.

Figure 5:
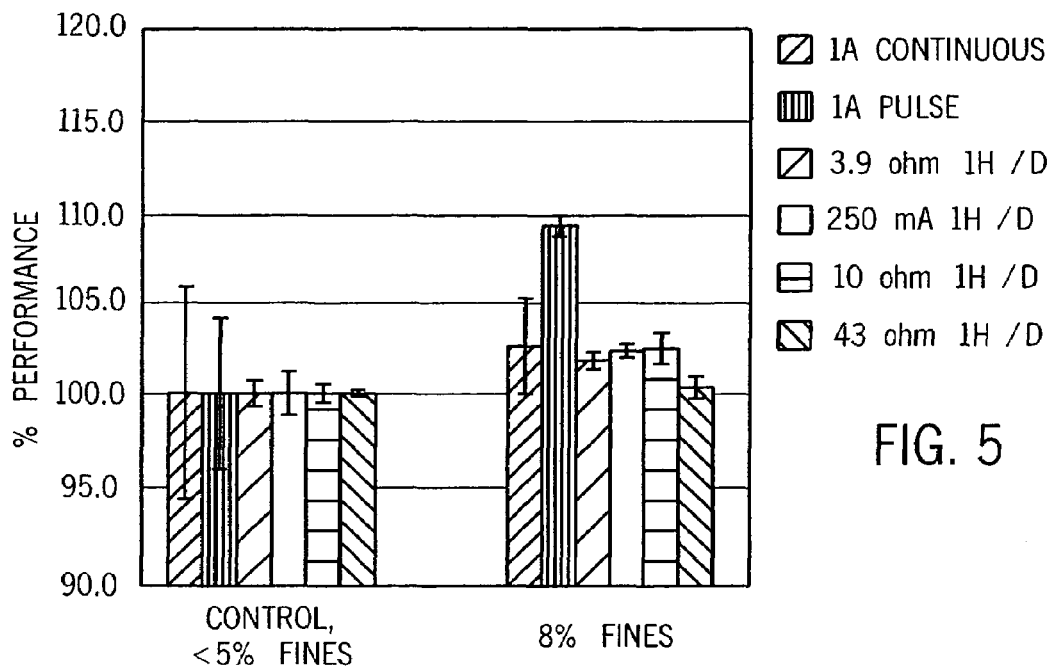
FIG. 5 is a graph illustrating cell performance as a function of the concentration of zinc fines in the anode.

FIG. 5 illustrates the results of various ANSI tests performed on a control cell and a test cell. The control cell had a KOH concentration of 37% and less than 5% zinc fines commonly present in the anode. The test cell had a KOH concentration of 34% and 8% zinc fines added to the anode. Both cells included a phosphate surfactant to suppress gassing. The separator was pre-wetted with 37% KOH concentration electrolyte for both cells. Both cells were tested at 1 A continuous, 1 A pulsed, 3.9 ohms at 1 hour/day, 250 mA at 1 hour/day, 10 ohm at 1 hour/day, and 43 ohm at 4 hours/day. In all cases, the test cell performed better than the control cell, thereby indicating that the reduction of KOH concentration from 37% and the addition of zinc fines increased cell performance. Cell performance was determined based on the amount of time that had elapsed for the cell to reach specific discharge voltages depending on the test. For instance, 1V was used for 1 A continuous discharge; 0.9V was used for 1 A pulse, 0.8V was used for 3.9 ohm 1 hr/day, 0.9V was used for 10 ohm 1 hr/day, and 0.9V was used for 43 ohm 4 hr/day.

Figure 6:
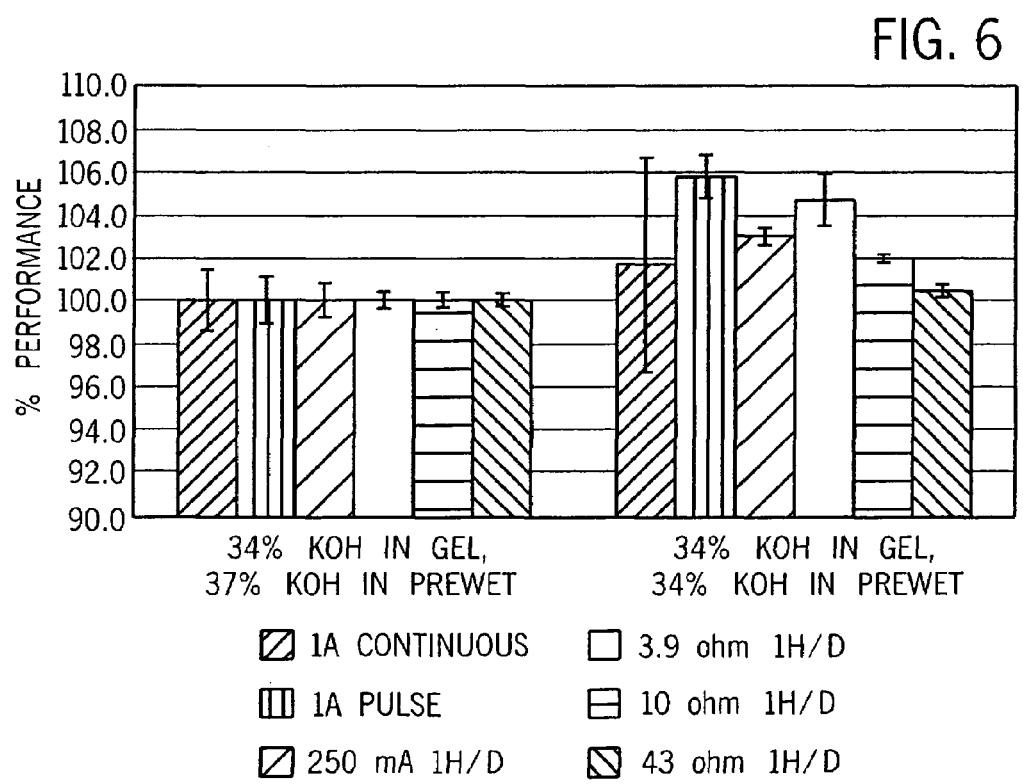
FIG. 6 is a graph illustrating cell performance as a function of the hydroxide concentration of electrolyte used to pre-wet the separator.

FIG. 6 illustrates that cell performance may be increased further by reducing the KOH concentration in electrolyte that is used to pre-wet the separator of the cell. In particular, a control cell and a test cell were tested under the conditions described above with reference to FIG. 5. The control cell and test cell both included 8% zinc fines, and 34% KOH concentration in the anode. The separator of the control cell was pre-wetted with electrolyte having a 37% KOH concentration, while the separator of the test cell was pre-wetted with electrolyte having a 34% KOH concentration. The increased cell performance of the test cell may thus be attributed to the decreased KOH concentration used to pre-wet the separator. The present invention contemplates that a KOH concentration within the range of 20% and 40%, and more preferably 30%-40%, and more preferably still 33% and 38% used to pre-wet the separator will produce increased cell performance with decreasing KOH concentrations. A KOH concentration between 20% and 30%, and more preferably between 25% and 30% to pre-wet the separator may also increase cell performance. Cell performance is particularly increased when the cell is discharged intermittently or during a pulsed discharge, as excess water is available for the cathodic reaction, and hydroxide ions are thus replenished during the rest period of the cell to fuel the anodic reaction. Cell performance in FIG. 6 was determined based on the criteria discussed above with reference to FIG. 5.

While additional reaction sites at the anode tend to produce increased gassing, the addition of sulfonated or sulfated organic acid surfactant alone or in combination with an organic phosphate ester surfactant reduces the gassing, thereby increasing cell performance. Nevertheless, the skilled artisan appreciates that the present invention may include, either alone or in combination, the KOH concentrations described herein, the addition of zinc particles as described herein, and the addition of sulfonated or sulfated organic acid surfactant alone, or in combination with an organic phosphate ester surfactant, to the anode, to improve cell performance as described throughout this disclosure.

Figure 7:
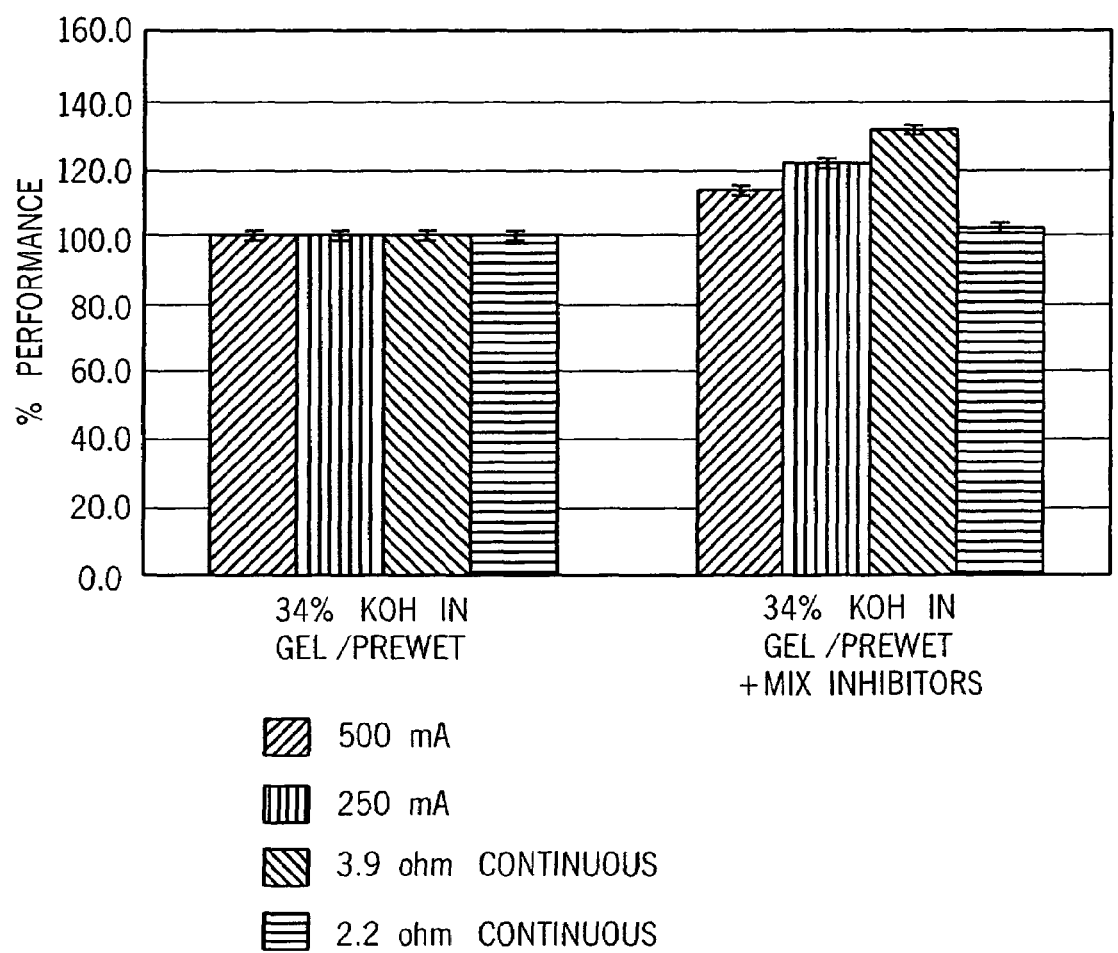
FIG. 7 is a graph illustrating cell performance of a function of a mix of inhibitors added to the anode.

FIG. 7 illustrates the performance of an LR6 test cell having a KOH concentration of 34% in the anode gel, a separator pre-wetted with 34% KOH, and a mixture of RM-510 (at 12 ppm relative to the anode gel) and Witconate (at 125 ppm relative to the anode gel) added to the anode gel. The test cell was discharged, and its performance compared to a control cell having 34% KOH in the gel, and a separator pre-wetted with 34% KOH, but with no Witconate added to the gel. Both the test cell and the control cell included an anode having 8% zinc fines. The cell performance, as determined by the amount of time needed for the cell to output 0.9V during continuous discharge, was found to increase when the mixture of inhibitors was used with a reduced KOH concentration. FIG. 7 thus shows that the addition of sulfonated or sulfated organic acid surfactant in combination with the use of an organic phosphate ester surfactant suppresses what was previously thought to be adverse effects of a low KOH concentration on continuous discharge performance, without adversely affecting the intermittent and pulse discharge performance gains observed at low KOH concentrations, as shown in FIG. 6. The use of relatively low centrations of KOH in the anode and pre-wet solutions (within any of the above-stated ranges) improves performance at high and low intermittent discharge rates.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements included within the spirit and scope of the invention, as set forth by the appended claims.

We claim:

1. A galled anode mixture comprising a metal alloy powder, a yelling agent, an alkaline electrolyte having a hydroxide concentration less than 40 weight %, and a surfactant having the general formula Y $SOx^-$ or a salt thereof, wherein x is 3 or 4, and wherein Y is selected from the group consisting of an alkyl group, an aryl group, an alkylaryl group, and a carboxy acid group.

2. A gelled anode mixture as claimed in claim 1 wherein the surfactant of formula Y $SOx^-$ is present in an amount sufficient to reduce gassing and maintain performance relative to an anode lacking this surfactant.

3. A gelled anode mixture as claimed in claim 1 wherein the surfactant is a salt of a sulfated octadecanoic acid.

4. A galled anode mixture as claimed in claim 1 wherein the surfactant is a sodium salt of sulfated oleic acid.

5. A gelled anode mixture as claimed in claim 1 further comprising an organic phosphate ester surfactant.

6. A galled anode mixture as claimed in claim 5 wherein the organic phosphate ester surfactant is an ethylene oxide-adduct organic phosphate ester.

7. A gelled anode mixture as claimed in claim 5 wherein the surfactant of formula Y $SOx^-$ is a salt of a sulfated octadecanoic acid.

8. A gelled anode mixture as claimed in claim 5 wherein the surfactant of formula Y $SOx^-$ is a sodium salt of sulfated oleic acid.

9. A gelled anode mixture as claimed in claim 5, wherein the organic phosphate ester surfactant is present at a concentration ranging substantially between 0.0003 weight % and 0.02 weight % relative to the gelled anode mixture.

10. A gelled anode mixture as claimed in claim 9, wherein the organic phosphate ester surfactant is present at a concentration ranging substantially between 0.0003 weight % and 0.02 weight % relative to the gelled anode mixture.

11. A gelled anode mixture as claimed in claim 5, wherein the organic phosphate ester surfactant is present at a concentration ranging substantially between 0.0004 weight % and 0.02 weight % relative to the metal in the gelled anode mixture.

12. A gelled anode mixture as claimed in claim 11, wherein the organic phosphate ester surfactant is present at a concentration ranging substantially between 0.0004 weight % and 0.0075 weight % relative to the metal in the gelled anode mixture.

13. A yelled anode mixture as claimed in claim 1 wherein the surfactant is present at a concentration ranging substantially between 0.001 weight % and 0.06 weight % relative to the gelled anode mixture.

14. A yelled anode mixture as claimed in claim 13, wherein the surfactant is present at a concentration ranging substantially between 0.002 weight % and 0.03 weight % relative to the gelled anode mixture.

15. A gelled anode mixture as claimed in claim 1 wherein the surfactant is present at a concentration ranging substantially between 0.0015 weight % and 0.09 weight % relative to the metal in the gelled anode mixture.

16. A gelled anode mixture as claimed in claim 15, wherein the surfactant is present at a concentration ranging substantially between 0.003 weight % and 0.045 weight % relative to the metal in the gelled anode mixture.

17. A gelled anode mixture as claimed in claim 1, further comprising zinc particles of −140 mesh size.

18. A gelled anode mixture as claimed in claim 17, wherein the zinc particles are of −200 mesh size.

19. A gelled anode mixture as claimed in claim 18, wherein the zinc particles are present at a concentration less than 10 weight % relative to the amount of metal in the mixture.

20. A gelled anode mixture as claimed in claim 18, wherein the zinc particles are present at a concentration of between 4 weight % and 8 weight %.

21. A gelled anode mixture as claimed in claim 18, wherein the zinc particles are present at a concentration of substantially 8 weight %.

22. A gelled anode mixture as claimed in claim 17, wherein the zinc particles are between +200 and −140 mesh size.

23. A gelled anode mixture as claimed in claim 22, wherein the hydroxide concentration is between 20 weight % and 30 weight %.

24. A gelled anode mixture as claimed in 17, wherein the zinc particles comprise zinc fines between +625 and −200 mesh size.

25. A gelled anode mixture as claimed in claim 24, wherein the hydroxide has a concentration between 30 weight % and 40 weight %.

26. A gelled anode mixture as claimed in claim 17, wherein the zinc is a zinc alloy.

27. A gelled anode mixture as claimed in claim 1, wherein the hydroxide concentration is substantially between 20 weight % and 40 weight %.

28. A gelled anode mixture as claimed in claim 27, wherein the hydroxide concentration is substantially between 30 weight % and 40 weight %.

29. A gelled anode mixture as claimed in claim 28, wherein the hydroxide concentration is substantially 34 weight %.

30. A gelled anode mixture as claimed in claim 1, wherein the hydroxide comprises KOH.

31. A gelled anode mixture comprising a metal alloy powder, a gelling agent, an alkaline electrolyte, zinc particles of −140 mesh size, and a surfactant having the general formula Y $SOx^-$ or a salt thereof, wherein x is 3 or 4, and wherein Y is selected from the group consisting of an alkyl group, an aryl group, an alkylaryl group, and a carboxy acid group.

32. A gelled anode mixture as claimed in claim 31 wherein the surfactant of formula Y $SOx^-$ is present in an amount sufficient to reduce gassing and maintain performance relative to an anode lacking this surfactant.

33. A gelled anode mixture as claimed in claim 31 wherein the surfactant is a salt of a sulfated octadecanoic acid.

34. A gelled anode mixture as claimed in claim 31 wherein the surfactant is a sodium salt of sulfated oleic acid.

35. A gelled anode mixture as claimed in claim 31 further comprising an organic phosphate ester surfactant.

36. A gelled anode mixture as claimed in claim 35 wherein the organic phosphate ester surfactant is an ethylene oxide-adduct organic phosphate ester.

37. A gelled anode mixture as claimed in claim 35, wherein the organic phosphate ester surfactant is present at a concentration ranging substantially between 0.0003 weight % and 0.02 weight % relative to the gelled anode mixture.

38. A gelled anode mixture as claimed in claim 37, wherein the organic phosphate ester surfactant is present at a concentration ranging substantially between 0.0003 weight % and 0.005 weight % relative to the gelled anode mixture.

39. A gelled anode mixture as claimed in claim 35, wherein the organic phosphate ester surfactant is present at a concentration ranging substantially between 0.0004 weight % and 0.02 weight % relative to the metal in the gelled anode mixture.

40. A gelled anode mixture as claimed in claim 39, wherein the organic phosphate ester surfactant is present at a concentration ranging substantially between 0.0004 weight % and 0.0075 weight % relative to the metal in the gelled anode mixture.

41. A gelled anode mixture as claimed in claim 35 wherein the surfactant of formula Y $SOx^-$ is a salt of a sulfated octadecanoic acid.

42. A gelled anode mixture as claimed in claim 35 wherein the surfactant of formula Y $SOx^-$ is a sodium salt of sulfated oleic acid.

43. A gelled anode mixture as claimed in claim 31 wherein the surfactant is present at a concentration ranging substantially between 0.001 weight % and 0.06 weight % relative to the gelled anode mixture.

44. A gelled anode mixture as claimed in claim 43, wherein the surfactant is present at a concentration ranging substantially between 0.002 weight % and 0.03 weight % relative to the gelled anode mixture.

45. A gelled anode mixture as claimed in claim 31 wherein the surfactant is present at a concentration ranging substantially between 0.0015 weight % and 0.09 weight % relative to the metal in the gelled anode mixture.

46. A gelled anode mixture as claimed in claim 45, wherein the surfactant is present at a concentration ranging substantially between 0.003 weight % and 0.045 weight % relative to the metal in the gelled anode mixture.

47. A gelled anode mixture as claimed in claim 31, wherein the zinc particles are of −200 mesh size.

48. A gelled anode mixture as claimed in claim 47, wherein the zinc particles are present at a concentration of less than 10 weight % relative to the gelled anode mixture.

49. A gelled anode mixture as claimed in claim 47, wherein the zinc fines are present at a concentration of between 4 weight % and 8 weight % relative to the gelled anode mixture.

50. A gelled anode mixture as claimed in claim 47, wherein the zinc fines are present at a concentration of substantially 8 weight % relative to the gelled anode mixture.

51. A gelled anode mixture as claimed in claim 47, wherein the zinc particles are present at a concentration between 1 weight % and 10 weight %.

52. A gelled anode mixture as claimed in claim 31, wherein the zinc particles are between +200 and −140 mesh size.

53. A gelled anode mixture as claimed in claim 52, further comprising a hydroxide having a concentration between 20 weight % and 30 weight %.

54. A gelled anode mixture as claimed in claim 31, wherein the zinc particles comprise zinc fines of +625 and −200 mesh size.

55. A gelled anode mixture as claimed in claim 31, wherein the electrolyte further comprising a hydroxide having a concentration between 20 weight % and 40 weight %.

56. A gelled anode mixture as claimed in claim 55, wherein the hydroxide has a concentration between 30 weight % and 40 weight %.

57. A gelled anode mixture as claimed in claim 55, wherein the hydroxide has a concentration between 20 weight % and 30 weight %.

58. A gelled anode mixture as claimed in claim 55, wherein the hydroxide is KOH.

59. A gelled anode mixture as claimed in claim 31, wherein the zinc particles include a zinc alloy.

60. A gelled anode mixture comprising a metal alloy powder, a gelling agent, an alkaline electrolyte having a hydroxide concentration less than 40 weight %, and zinc particles, wherein between 10 weight % and 40 weight % of the zinc particles are between +200 and −140 mesh size.

61. A gelled anode mixture as claimed in claim 60 wherein the hydroxide concentration is between 20 weight % and 30 weight %.

62. A gelled anode mixture as claimed in claim 60, wherein the zinc particles comprise zinc fines between +625 and −200 mesh size.

63. A gelled anode mixture as claimed in claim 62, wherein the hydroxide concentration is between 30 weight % and 40 weight %.

64. A gelled anode mixture as claimed in claim 63, wherein the hydroxide concentration is substantially 34 weight %.

65. A gelled anode mixture as claimed in claim 60, wherein the zinc particles comprise a zinc alloy.

66. A gelled anode mixture as claimed in claim 60, wherein the hydroxide concentration is substantially between 20 weight % and 40 weight %.

67. A gelled anode mixture as claimed in claim 60, further comprising a surfactant having the general formula Y $SOx^-$ or a salt thereof wherein x is 3 or 4, and wherein Y is selected from the group consisting of an alkyl group an aryl group, an alkylaryl group, and a carboxy acid group.

68. A gelled anode mixture as claimed in claim 67 wherein the surfactant of formula Y $SOx^-$ is a salt of a sulfated octadecanoic acid.

69. A gelled anode mixture as claimed in claim 67 wherein the surfactant of formula Y $SOx^-$ is a sodium salt of sulfated oleic acid.

70. A gelled anode mixture as claimed in claim 67 further comprising an organic phosphate ester surfactant.

71. A gelled anode mixture as claimed in claim 70 wherein the organic phosphate ester surfactant is an ethylene oxide-adduct organic phosphate ester.

72. A gelled anode mixture as claimed in claim 71 wherein the surfactant of formula Y $SOx^-$ is a salt of a sulfated octadecanoic acid.

73. A gelled anode mixture as claimed in claim 71 wherein the surfactant of formula Y $SOx^-$ is a sodium salt of sulfated oleic acid.

74. A gelled anode mixture as claimed in claim 67 wherein the surfactant of formula Y $SOx^-$ is present in an amount sufficient to reduce gassing and maintain performance relative to an anode lacking this surfactant.

75. An alkaline electrochemical cell comprising:
a positive current collector;
a cathode in contact with the positive current collector;
a gelled anode comprising a metal alloy powder, a gelling agent, an alkaline electrolyte having a hydroxide concentration less than substantially 40 weight %, and a surfactant having the general formula Y $SOx^-$ or a salt thereof, wherein x is 3 or 4 and wherein Y is selected from the group consisting of an alkyl group, an aryl group, an alkylaryl group, and a carboxy acid group;
a separator between the cathode and the anode; and
a negative current collector in electrical contact with the anode.

76. An alkaline electrochemical cell as claimed in claim 75 wherein the surfactant of formula Y $SOx^-$ is present in an amount sufficient to reduce gassing and maintain performance relative to an anode lacking this surfactant.

77. An alkaline electrochemical cell as claimed in claim 75 wherein the surfactant is a salt of a sulfated octadecanoic acid.

78. An alkaline electrochemical cell as claimed in claim 75 wherein the surfactant is a sodium salt of sulfated oleic acid.

79. An alkaline electrochemical cell as claimed in claim 75 further comprising an organic phosphate ester surfactant.

80. An alkaline electrochemical cell as claimed in claim 79 wherein the organic phosphate ester surfactant is an ethylene oxide-adduct organic phosphate ester.

81. An alkaline electrochemical cell as claimed in claim 79 wherein the surfactant of formula Y $SOx^-$ is a salt of a sulfated octadecanoic acid.

82. An alkaline electrochemical cell as claimed in claim 79 wherein the surfactant of formula Y $SOx^-$ is a sodium salt of sulfated oleic acid.

83. An alkaline electrochemical cell as claimed in claim 79, wherein the organic phosphate ester surfactant is present at a concentration ranging substantially between 0.0003 weight % and 0.02 weight % relative to the gelled anode mixture.

84. An alkaline electrochemical cell as claimed in claim 83 wherein the organic phosphate ester surfactant is present at a concentration ranging substantially between 0.0003 weight % and 0.005 weight % relative to the gelled anode mixture.

85. An alkaline electrochemical cell as claimed in claim 79, wherein the organic phosphate ester surfactant is present at a concentration ranging substantially between 0.0004 weight % and 0.02 weight % relative to the metal in the gelled anode mixture.

86. An alkaline electrochemical cell as claimed in claim 85, wherein the organic phosphate ester surfactant is present at a concentration ranging substantially between 0.0004 weight % and 0.01 weight % relative to the metal in the gelled anode mixture.

87. An alkaline electrochemical cell as claimed in claim 75 wherein the surfactant is present at a concentration ranging substantially between 0.001 weight % and 0.06 weight % relative to the gelled anode mixture.

88. An alkaline electrochemical cell as claimed in claim 87, wherein the surfactant is present at a concentration ranging substantially between 0.002 weight % and 0.03 weight % relative to the gelled anode mixture.

89. An alkaline electrochemical cell as claimed in claim 75, wherein the surfactant is present at a concentration ranging substantially between 0.0015 weight % and 0.09 weight % relative to the metal in the gelled anode mixture.

90. An alkaline electrochemical cell as claimed in claim 89, wherein the surfactant is present at a concentration ranging substantially between 0.003 weight % and 0.045 weight % relative to the metal in the gelled anode mixture.

91. An alkaline electrochemical cell as claimed in claim 75, further comprising zinc particles of −140 mesh size.

92. An alkaline electrochemical cell as claimed in claim 91, wherein the zinc particles are of −200 mesh size.

93. An alkaline electrochemical cell as claimed in claim 92, wherein the zinc particles are present at a concentration less than 10 weight % relative to the amount of metal in the anode.

94. An alkaline electrochemical cell as claimed in claim 92, wherein the zinc particles are present at a concentration of between 4 weight % and 10 weight % relative to the amount of metal in the anode.

95. An alkaline electrochemical cell as claimed in claim 92, wherein the zinc particles are present at a concentration of substantially 8 weight % relative to the amount of metal in the anode.

96. An alkaline electrochemical cell as claimed in claim 91, wherein the zinc particles are between +200 and −140 mesh size.

97. An alkaline electrochemical cell as claimed in 96, wherein the hydroxide concentration is between 20 weight % and 30 weight %.

98. An alkaline electrochemical cell as claimed in claim 91, wherein the zinc particles comprise a zinc alloy.

99. An alkaline electrochemical cell as claimed in claim 91, wherein the zinc particles comprise zinc fines between +625 and −140 mesh size.

100. An alkaline electrochemical cell as claimed in claim 99, wherein the hydroxide concentration is between 30 weight % and 40 weight %.

101. An alkaline electrochemical cell as claimed in claim 75, wherein the hydroxide concentration is substantially between 20 weight % and 40 weight %.

102. An alkaline electrochemical cell as claimed in claim 75, wherein the separator is pre-wetted with electrolyte having a hydroxide concentration between 30 weight % and 40 weight %.

103. An alkaline electrochemical cell comprising:
a positive current collector;
a cathode in contact with the positive current collector;
a gelled anode comprising a metal alloy powder, a gelling agent, an alkaline electrolyte, zinc particles having an average diameter of −140 mesh size, and a surfactant having the general formula $Y\ SOx^-$ or a salt thereof, wherein x is 3 or 4, and wherein Y is selected from the group consisting of an alkyl group, an aryl group, an alkylaryl group, and a carboxy acid group;
a separator between the cathode and the anode; and
a negative current collector in electrical contact with the anode.

104. An alkaline electrochemical cell as claimed in claim 103 wherein the surfactant of formula $Y\ SOx^-$ is present in an amount sufficient to reduce gassing and maintain performance relative to an anode lacking this surfactant.

105. An alkaline electrochemical cell as claimed in claim 103 wherein the surfactant is a salt of a sulfated octadecanoic acid.

106. An alkaline electrochemical cell as claimed in claim 103 wherein the surfactant is a sodium salt of sulfated oleic add.

107. An alkaline electrochemical cell as claimed in claim 103 further comprising an organic phosphate ester surfactant.

108. An alkaline electrochemical cell as claimed in claim 107 wherein the organic phosphate ester surfactant is an ethylene oxide-adduct organic phosphate ester.

109. An alkaline electrochemical cell as claimed in claim 107 wherein the surfactant of formula $Y\ SOx^-$ is a salt of a sulfated octadecanoic acid.

110. An alkaline electrochemical cell as claimed in claim 107 wherein the surfactant of formula $Y\ SOx^-$ is a sodium salt of sulfated oleic acid.

111. An alkaline electrochemical cell as claimed in claim 107, wherein the organic phosphate ester surfactant is present at a concentration ranging substantially between 0.0003 weight % and 0.02 weight % relative to the gelled anode mixture.

112. An alkaline electrochemical cell as claimed in claim 111 wherein the organic phosphate ester surfactant is present at a concentration ranging substantially between 0.0003 weight % and 0.005 weight % relative to the gelled anode mixture.

113. An alkaline electrochemical cell as claimed in claim 107, wherein the organic phosphate ester surfactant is present at a concentration ranging substantially between 0.0004 weight % and 0.02 weight % relative to the metal in the gelled anode mixture.

114. An alkaline electrochemical cell as claimed in claim 113, wherein the organic phosphate ester surfactant is present at a concentration ranging substantially between 0.0004 weight % and 0.01 weight % relative to the metal in the gelled anode mixture.

115. An alkaline electrochemical cell as claimed in claim 103 wherein the surfactant is present at a concentration ranging substantially between 0.00 1 weight % and 0.06 weight % relative to the gelled anode mixture.

116. An alkaline electrochemical cell as claimed in claim 115, wherein the surfactant is present at a concentration ranging substantially between 0.002 weight % and 0.03 weight % relative to the gelled anode mixture.

117. An alkaline electrochemical cell as claimed in claim 103, wherein the surfactant is present at a concentration ranging substantially between 0.0015 weight % and 0.09 weight % relative to the metal in the gelled anode mixture.

118. An alkaline electrochemical cell as claimed in claim 117, wherein the surfactant is present at a concentration ranging substantially between 0.003 weight % and 0.045 weight % relative to the metal in the gelled anode mixture.

119. An alkaline electrochemical cell as claimed in claim 103, wherein the zinc particles are between +200 and −140 mesh size.

120. An alkaline electrochemical cell as claimed in 119, wherein the electrolyte has a hydroxide concentration between 20 weight % and 30 weight %.

121. An alkaline electrochemical cell as claimed in claim 103, wherein the zinc particles comprise zinc fines between +625 and 200 mesh size.

122. An alkaline electrochemical cell as claimed in claim 121, wherein the electrolyte comprises a hydroxide having a concentration substantially between 30 weight % and 40 weight %.

123. An alkaline electrochemical cell as claimed in claim 103, wherein the electrolyte has a hydroxide concentration substantially between 20 weight % and 40 weight %.

124. An alkaline electrochemical cell as claimed in claim 103, wherein the separator is pre-wetted with electrolyte having a hydroxide concentration between 30 weight % and 40 weight %.

125. An alkaline electrochemical cell as claimed in claim 103, wherein the zinc particles comprise a zinc alloy.

126. An alkaline electrochemical cell as claimed in claim 103, wherein the zinc particles are of −200 mesh size.

127. An alkaline electrochemical cell as claimed in claim 126, wherein the zinc particles are present at a concentration of less than 10 weight % relative to the metal in the anode.

128. An alkaline electrochemical cell as claimed in claim 126, wherein the zinc particles are present at a concentration of between 4 weight % and 8 weight % relative to the gelled anode mixture.

129. An alkaline electrochemical cell as claimed in claim 126, wherein the zinc particles are present at a concentration of substantially 8 weight % relative to the gelled anode mixture.

130. An alkaline electrochemical cell comprising:
a positive current collector;
a cathode in contact with the positive current collector;
a gelled anode mixture comprising a metal alloy powder, a galling agent, an alkaline electrolyte having a hydroxide concentration less than 40 weight %, and zinc particles, wherein between 10 weight % and 40 weight % of the zinc particles are between +200 and −140 mesh size;

a separator between the cathode and the anode; and a negative current collector in electrical contact with the anode.

131. An alkaline electrochemical cell as claimed in claim 130, wherein the hydroxide concentration is between 20 weight % and 30 weight %.

132. An alkaline electrochemical cell as claimed in claim 130, wherein the zinc particles comprise zinc fines between +625 and −200 mesh size.

133. An alkaline electrochemical cell as claimed in claim 132, wherein the hydroxide concentration is between 30 weight % and 40 weight %.

134. An alkaline electrochemical cell as claimed in claim 133, wherein the hydroxide concentration is substantially 34 weight %.

135. An alkaline electrochemical cell as claimed in claim 130, wherein the zinc particles comprise a zinc alloy.

136. An alkaline electrochemical cell as claimed in claim 130, wherein the hydroxide concentration is substantially between 20 weight % and 40 weight %.

137. An alkaline electrochemical cell as claimed in claim 130, further comprising a surfactant having the general formula Y $SOx^-$ or a salt thereof, wherein x is 3 or 4, and wherein Y is selected from the group consisting of an alkyl group, an aryl group, an alkylaryl group, and a carboxy acid group.

138. An alkaline electrochemical cell as claimed in claim 137 wherein the surfactant of formula Y $SOx^-$ is a salt of a sulfated octadecanoic acid.

139. An alkaline electrochemical cell as claimed in claim 137 wherein the surfactant is a sodium salt of sulfated oleic acid.

140. An alkaline electrochemical cell as claimed in claim 137 further comprising a phosphate ester surfactant.

141. An alkaline electrochemical cell as claimed in claim 140 wherein the organic phosphate ester surfactant is an ethylene oxide-adduct organic phosphate ester.

142. An alkaline electrochemical cell as claimed in claim 141 wherein the surfactant of formula Y $SOx^-$ is a salt of a sulfated octadecanoic acid.

143. An alkaline electrochemical cell as claimed in claim 141 wherein the surfactant of formula Y $SOx^-$ is a sodium salt of sulfated oleic acid.

144. An alkaline electrochemical cell as claimed in claim 137 wherein the surfactant of formula Y $SOx^-$ is present in an amount sufficient to reduce gassing and maintain performance relative to an anode lacking this surfactant.

* * * * *